United States Patent [19]

Brophy et al.

[11] Patent Number: 5,336,471
[45] Date of Patent: Aug. 9, 1994

[54] SUPPORT OF CERAMIC CATALYST

[75] Inventors: Mark E. Brophy; Robin B. Rhodes; Wayne S. Counterman, all of Wellsville, N.Y.

[73] Assignee: ABB Air Preheater, Inc., Wellsville, N.Y.

[21] Appl. No.: 64,814

[22] Filed: May 19, 1993

[51] Int. Cl.⁵ .......................... F01N 3/10; F28D 19/04
[52] U.S. Cl. .................................. 422/175; 422/177; 422/173; 422/206; 422/209; 165/8; 165/10
[58] Field of Search ............... 422/175, 206, 173, 177, 422/178, 180, 209; 165/10, 8; 502/439

[56] References Cited

U.S. PATENT DOCUMENTS

| | | | |
|---|---|---|---|
| 3,058,723 | 10/1962 | Nilsson et al. | 165/10 |
| 3,072,182 | 1/1963 | Persson | 165/9 |
| 3,101,778 | 8/1963 | Hazzard et al. | 165/10 |
| 3,209,058 | 9/1965 | Hazzard | 165/8 |
| 4,627,485 | 12/1986 | Osborn | 165/8 |
| 4,678,643 | 7/1987 | Fetzer | 165/8 |
| 4,739,822 | 4/1988 | Mergler | 165/10 |
| 4,773,145 | 9/1988 | Baker et al. | 165/8 |
| 5,108,716 | 4/1992 | Nishizawa | 422/177 |
| 5,145,652 | 9/1992 | Veser et al. | 422/175 |

Primary Examiner—Robert J. Warden
Assistant Examiner—Hien Tran
Attorney, Agent, or Firm—Chilton, Alix & Van Kirk

[57] ABSTRACT

Ceramic blocks which may be catalyst coated having gas flow channels therethrough are supported in a metal framework to form a removable basket for a rotary regenerative air heater. The blocks are supported between compressed packing material with individual rows being supported at one inlet edge and the opposite outlet edge by Z-plates.

4 Claims, 3 Drawing Sheets

SUPPORT OF CERAMIC CATALYST

BACKGROUND OF THE INVENTION

This invention relates to a system for supporting blocks such as ceramic blocks which may be catalyst coated within a support framework for flow of a gas therethrough and more particularly to apparatus for mounting the ceramic blocks in a rotary regenerative heat exchanger.

Because of more stringent regulations of nitrogen oxide emissions from combustion sources, various methods are being employed to reduce such emissions. Some of these methods involve changes in the combustion process to reduce nitrogen oxide formation while others involve treatment of the flue gases to remove the nitrogen oxides which have been formed. One of the latter techniques is to catalytically reduce the nitrogen oxides to nitrogen and oxygen.

One of the ways in which a flue gas is catalytically treated is to provide the catalyst in a duct or more likely as a part of a rotary regenerative air preheater through which the flue gas passes. As examples, see U.S. Pat. Nos. 4,678,643 and 5,145,652 and the copending U.S. patent application Ser. No. 945,014 filed Sep. 15, 1992, now abandoned. One of the ways this is done is to provide ceramic blocks with gas flow channels that are coated with a catalyst in the rotor of the air preheater. Also, ceramic blocks may be used in air preheaters for other reasons such as corrosion and fire resistance. Supporting these blocks in an air preheater presents certain problems.

SUMMARY OF THE INVENTION

The invention has the object of supporting blocks of material in baskets and particularly the baskets of a rotary regenerative air heater and more specifically for supporting blocks of ceramic or other heat resistant material which also may contain a catalyst. An object is accommodate differential thermal expansion between the blocks and the basket while maintaining the blocks in position and open to flow using the least possible number of manufactured basket components. The invention involves the use of compressed packing material and support plates.

DESCRIPTION OF THE PREFERRED EMBODIMENT

Figure 1:
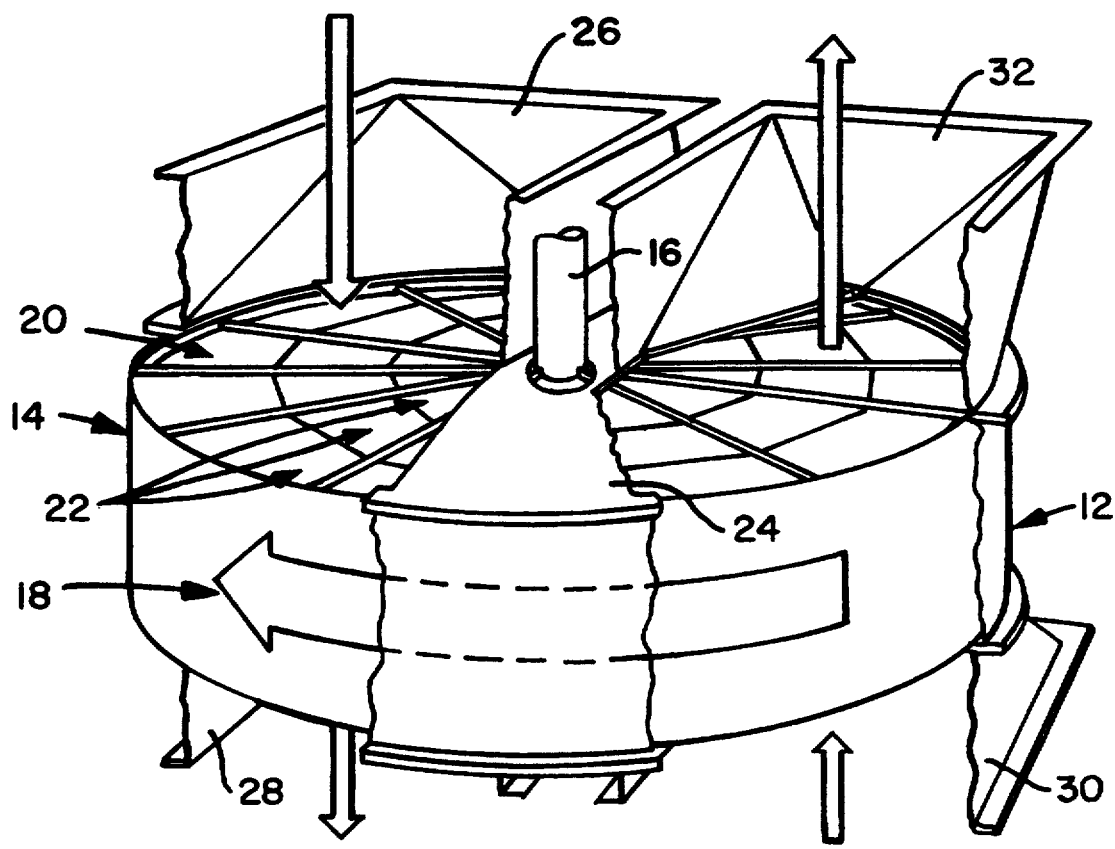
FIG. 1 is a general perspective view of an air heater rotor showing the baskets in each sector.

FIG. 1 of the drawings is a partially cut-away perspective view of a typical air heater showing a housing 12 in which the rotor 14 is mounted on drive shaft or post 16 for rotation as indicated by the arrow 18. The rotor is composed of a plurality of sectors 20 with each sector containing a number of basket modules 22. The basket modules contain the heat exchange surface. The housing is divided by means of the sector plate 24 into a flue gas side and an air side. The hot flue gases enter the air heater through the gas inlet duct 26, flow through the rotor where heat is transferred to the rotor and then exit through gas outlet duct 28. The countercurrent flowing air enters through air inlet duct 30, flows through the rotor where it picks up heat and then exits through air outlet duct 32.

In the present invention, the heat exchange surface in the rotor comprises ceramic blocks which may also serve the dual function of transferring heat and catalyzing a desired reaction. The invention will be described in terms of catalyst coated ceramic but it is to be understood that the invention is not limited to that embodiment. As previously indicated, the reaction of primary concern is the reduction of nitrogen oxides which The heat exchange surface employed in the present invention is in the form of ceramic blocks which have channels extending axially therethrough and which are coated with the catalyst. Any catalyst may be employed in the present invention which is adapted to carry out the desired reaction and examples are titanium dioxide and vanadium oxide. The ceramic blocks are commercially available items such as "Celcor" from Corning Glass Works. Blocks are available with anywhere from 1.2 to 62 channels per square centimeter and in varying lengths up to perhaps 50 centimeters.

The present invention is directed to the mounting of the ceramic blocks in the air heater baskets. The object is to mount the blocks with the least number of manufactured parts, so as to accommodate differential thermal expansion between the blocks and the basket frame and to support the blocks against axial movement without unduly blocking the flow channels.

Figure 2:
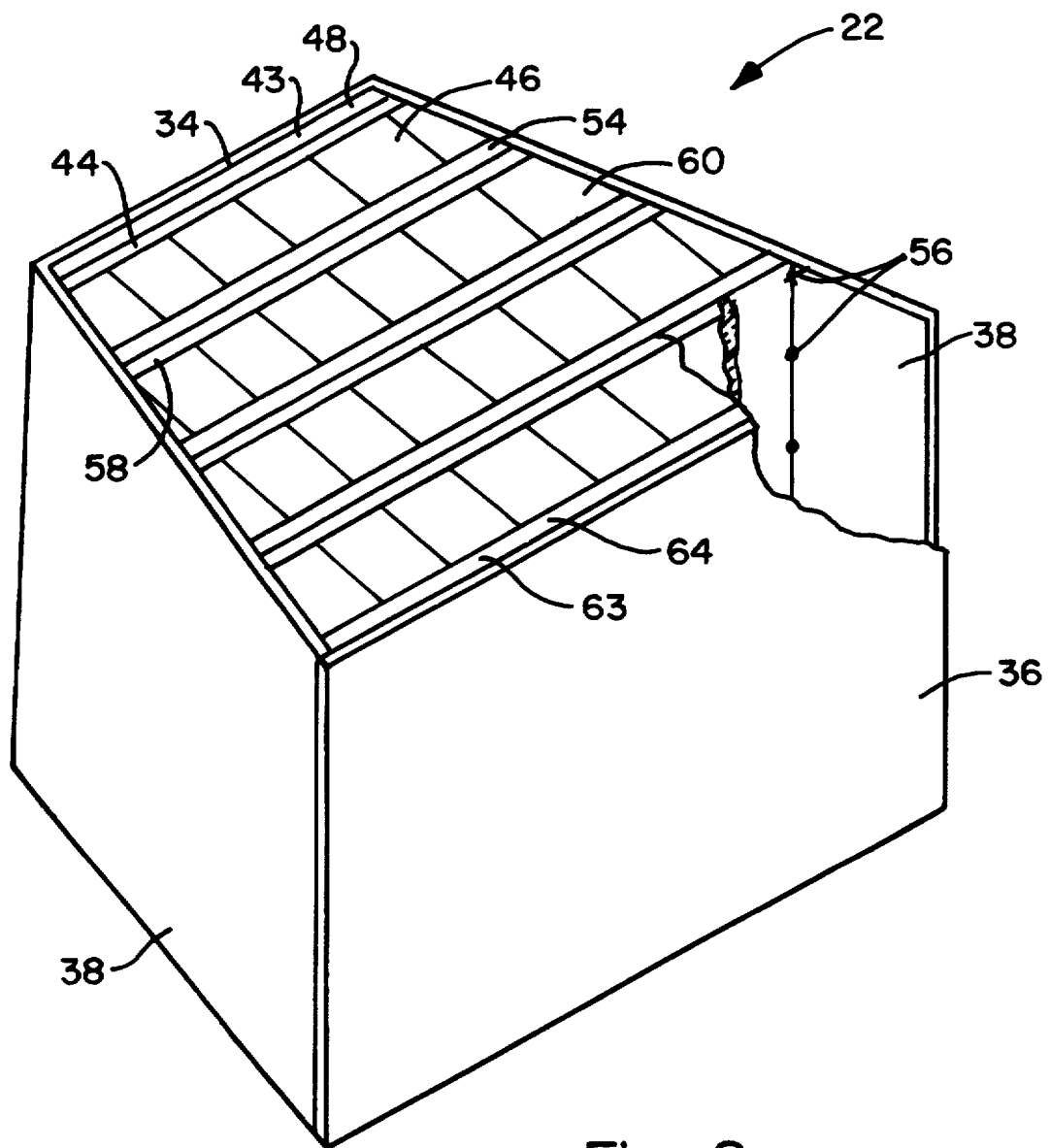
FIG. 2 is a perspective view of one of the baskets of the present invention.
Figure 3:
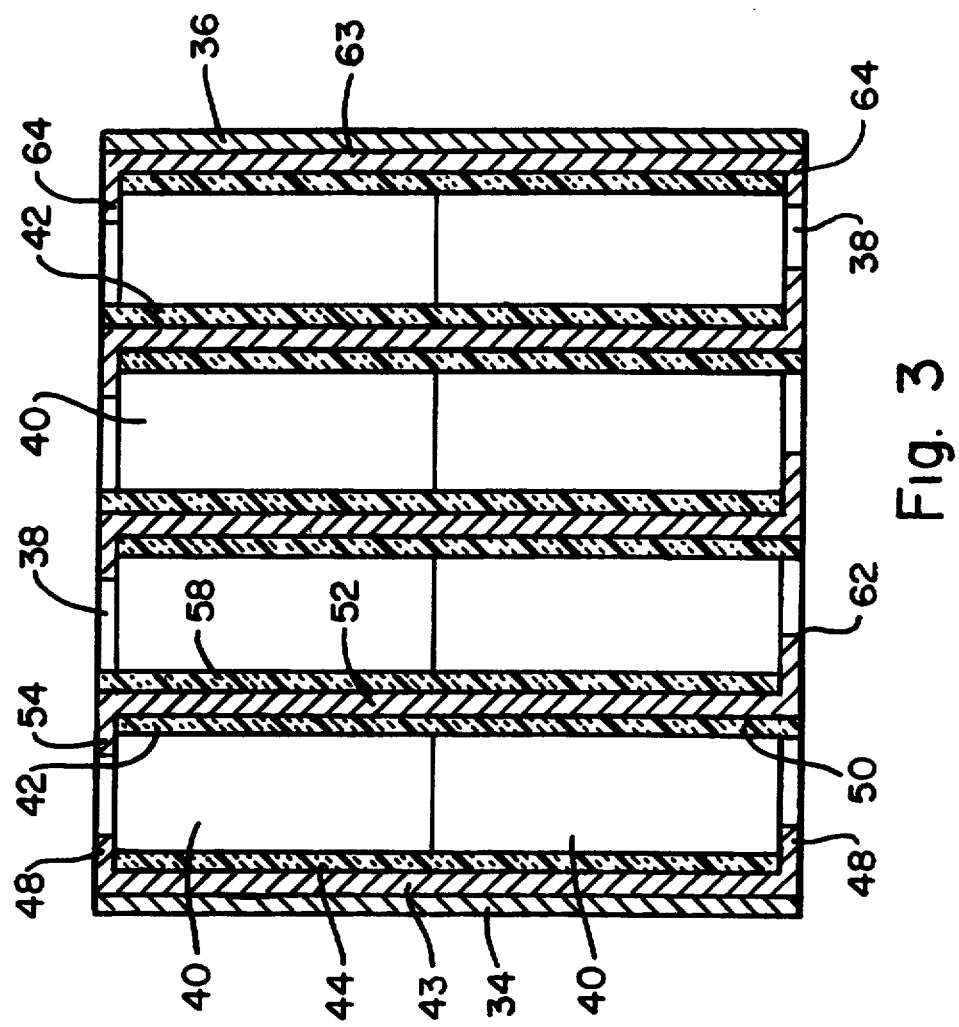
FIG. 3 is a vertical cross section view of a basket of the present invention.

Referring to FIGS. 2 and 3, which show a typical individual basket, the basket frame has an inboard end 34, an outboard end 36, and two side walls 38. Typically the two side walls 38 and the inboard end 34 would be formed from one bent plate. The top and bottom of the basket frame are open for gas and air flow. Mounted within the basket are the ceramic blocks 40. Although FIG. 3 shows two blocks in each stack, there could be any desired number of blocks depending primarily on the height of the basket. The blocks are mounted between compressed packing material 42 which is preferably a fiber blanket of ceramic fibers. For example the blanket may be composed of "Cerwool" which is a ceramic fiber blanket produced by Premier Refractories.

Mounted and welded in place against the inboard end 34 is the plate 43 which has outwardly extending lips 48 on the top and bottom. This plate is referred to as the inboard "C-plate" because of the shape with the lips on the top and bottom. The placement of the blocks in the basket begins by placing the layer 44 of packing adjacent into place against the packing layer 44 and supported by the lips 48 on the top and bottom of the inboard C-plate 43. It can be seen in FIG. 3 that these lips 48 extends far enough to engage the edge of the block but leaves the majority of the block open for flow. Another packing layer 50 is then placed against the outer side of the first row.

The next step is to install the support plate 52. This plate is referred to as a "Z-plate" because of its shape with the lips on the top and bottom. The lip 54 on the top extends out over the edge of the blocks 40 in the first row and holds them in position. The Z-plate is forced into position so as to compress the packing layers 44 and 50 and then tack welded to both side walls 38 of the basket frame. FIG. 2 is cut-away at one upper corner to show this tack welding 56.

The next step is to install the next packing layer 58 up against the Z-plate 52. The second row of blocks 60 is then installed up against the packing layer 58 and resting on the lip 62 on the bottom of the Z-plate 52. The construction of the remainder of the basket module continues outwardly in the same manner followed by the placement and welding of the outboard C-plate 63. This outer C-plate 63 has lips 64 on the top and the bottom. The construction is then completed by welding the outboard end or basket cover 36 into position against the C-plate 63. In an actual embodiment, the Z-plates might be 18 to 24 gauge stainless steel with 0.47 centimeter lips. The packing layers might then be 0.3 centimeters in the compressed state.

The use of the Z-plate to support the ceramic block is an advantage because the particular shape resists bending, can maintain the compaction pressures and limits the number of required parts. The lips prevent movement of the blocks in the axial or gas/air flow direction. Furthermore, because the blocks are individually held in place axially at the bottom inboard edge and the top outer edge, there is greater flexibility with respect for accommodating thermal expansion differences. If the blocks and placed in the basket without support for individual rows and blocks, the greater expansion of the metal frame of the basket as compared to the ceramic blocks would open up significant gaps that would permit shifting of the blocks. However, since individual blocks are supported, the differential expansion will not create any gaps that are not accommodated by expansion (decompression) of the blanket.

Although the invention has been described thus far in relation to baskets in rotary regenerative air heaters, it could also be used in connection with ceramic blocks with or without a catalyst in a stationary position such as in a duct. In that case, the same support structure would be used except that the basket may not be tapered so as to fit into a rotor. It would more likely be square or rectangular to fit into a duct. In that case, the ceramic blocks would not be used for heat exchange or they would be used in a recuperative heat exchange arrangement rather than regenerative.

We claim:

1. A heat exchanger basket module for a rotary regenerative heat exchanger having open top and bottom surfaces for the passage of gases therethrough comprising:
   a. a frame having inboard and outboard ends, two sides and open top and bottom surfaces;
   b. a plurality of rows of ceramic blocks having channels therethrough with said rows extending parallel to said inboard and outboard ends and from one of said sides to the other side, each row having an inboard surface and an outboard surface and said channels extending between said open top and bottom surfaces of said frame for the passage of gases through said channels;
   c. an inboard compressible packing material layer adjacent to the inboard surface of each row, each inboard layer having an inboard surface and an outboard surface;
   d. an outboard compressible packing material layer adjacent to the outboard surface of each row, each outboard layer having an inboard surface and an outboard surface;
   e. an inboard support plate attached to said frame adjacent to said inboard end of said frame, said inboard support plate having top and bottom edges and a bottom lip extending toward the outboard end of said frame from said bottom edge of said inboard support plate and under the adjacent inboard layer and partially under the adjacent row to support the adjacent inboard layer and the adjacent row;
   f. an outboard support plate attached to said frame adjacent to said outboard end of said frame, said outboard support plate having top and bottom edges and a top lid extending toward the inboard end of said frame from said top edge of said outboard support plate and over the adjacent outboard layer and partially over the adjacent row to support the adjacent outboard layer and the adjacent row;
   g. an intermediate support plate adjacent to the outboard surface of each of said outboard layers, said intermediate support plates being attached to said frame in a position to maintain said outboard layers in a compressed state and having top and bottom edges;
   h. a top lip extending from the top edge of each intermediate support plate and extending toward the inboard end of said frame over the adjacent outboard layer and partially over the adjacent row to support the adjacent outboard layers and the adjacent rows; and
   i. a bottom lip extending from the bottom edges of each intermediate support plate and extending toward the outboard end of said frame under the adjacent inboard layer and partially under the adjacent row to support the adjacent inboard layers and the adjacent rows.

2. A heat exchanger basket module as recited in claim 1 wherein said inboard support plate further includes a top lip extending toward the outboard end of said frame from said top edge of said inboard support plate and over the adjacent inboard layer and partially over the adjacent row.

3. A heat exchanger basket module as recited in claim 2 wherein said outboard support plate further includes a bottom lip extending toward the inboard end of said frame from said bottom edge of said outboard support plate and under the adjacent outboard layer and partially under the adjacent row.

4. A heat exchanger basket module as recited in claim 1 wherein said ceramic blocks include a catalyst coating.

* * * * *

UNITED STATES PATENT AND TRADEMARK OFFICE
CERTIFICATE OF CORRECTION

PATENT NO. : 5,336,471
DATED : August 9, 1994
INVENTOR(S) : Mark E. Brophy et al It is certified that error appears in the above-indentified patent and that said Letters Patent is hereby corrected as shown below:

Claim 1, column 4, line 19, change "lid" to --lip--.

Claim 1, column 4, line 38, change "edges" to --edge--.

Signed and Sealed this

Sixteenth Day of May, 1995

Attest:

BRUCE LEHMAN

Attesting Officer        Commissioner of Patents and Trademarks